US009364751B2

(12) United States Patent
Avent et al.

(10) Patent No.: US 9,364,751 B2
(45) Date of Patent: Jun. 14, 2016

(54) INTERACTIVE COMPUTER GAME (75) Inventors: Jason Avent, Brighton (GB); Kim Burrows, Brighton (GB)

(73) Assignee: Disney Enterprises, Inc., Burbank, CA (US)

( * ) Notice: Subject to any disclaimer, the term of this patent is extended or adjusted under 35 U.S.C. 154(b) by 2519 days.

(21) Appl. No.: 12/022,340

(22) Filed: Jan. 30, 2008

(65) Prior Publication Data

US 2009/0191970 A1 Jul. 30, 2009

(51) Int. Cl.
*A63F 13/00* (2014.01)
*A63F 13/30* (2014.01)

(52) U.S. Cl.
CPC .......... *A63F 13/12* (2013.01); *A63F 2300/407* (2013.01); *A63F 2300/538* (2013.01); *A63F 2300/5566* (2013.01); *A63F 2300/577* (2013.01)

(58) Field of Classification Search
CPC .............. A63F 13/12; A63F 2300/407; A63F 2300/538; A63F 2300/5566; A63F 2300/577
USPC .......................................................... 463/40
See application file for complete search history.

(56) References Cited

U.S. PATENT DOCUMENTS

| 6,080,063 | A | 6/2000 | Khosla |
| 2002/0183115 | A1 | 12/2002 | Takahashi et al. |
| 2003/0038805 | A1 | 2/2003 | Wong et al. |
| 2003/0054869 | A1* | 3/2003 | Hightower ........................ 463/6 |
| 2003/0220143 | A1 | 11/2003 | Shteyn et al. |
| 2006/0135236 | A1* | 6/2006 | Sato et al. ........................ 463/6 |
| 2007/0117617 | A1 | 5/2007 | Spanton et al. |
| 2009/0011831 | A1* | 1/2009 | Yamada ........................ 463/37 |

FOREIGN PATENT DOCUMENTS

| EP | 1262217 A2 | 1/2002 |
| EP | 1637197 A1 | 3/2006 |
| WO | 02068075 A1 | 9/2002 |

OTHER PUBLICATIONS

International Search Report, Jun. 12, 2009, PCT/US2009/031535, European Patent Office.
PCT International Search Report, PCT/US2009/031459, dated Mar. 19, 2009.

* cited by examiner

*Primary Examiner* — Kang Hu
(74) *Attorney, Agent, or Firm* — Marsh Fischmann & Breyfogle LLP; Kent A. Lembke (57) ABSTRACT A method for providing an interactive video game over a digital communications network. The method involves operating an interactive computer game on interconnected computer games terminals. The method includes receiving, at each of the computer games terminals, interactive user input data from a controller associated with the computer games terminal and also interactive user input data from a controller associated with each of the other of the plurality of computer game terminals. The method further includes rendering a graphical representation of the computer game based on the interactive user input data. Then, with at least one of the plurality of computer game terminals, non-interactive user input data is received from a controller associated with a further computer games terminal associated with a non-interactive user. The method continues with rendering the graphical representation of the computer game based on the interactive user input data and, selectively, the non-interactive user input data.

14 Claims, 7 Drawing Sheets

INTERACTIVE COMPUTER GAME

CROSS-REFERENCE TO RELATED APPLICATIONS

This application is related to co-pending U.S. patent application Ser. No. 12/022,000, filed Jan. 29, 2008, entitled "Interactive Computer Game," and incorporated herein by reference in its entirety.

BACKGROUND TO THE INVENTION

1. Field of the Invention

The invention is concerned with interactive computer games, and in particular with interactive computer games where multiple users may play an interactive computer game together. The invention is particularly, but not exclusively, concerned with the provision of interactive computer games in which multiple users are connected via a network such as the Internet.

2. Description of the Related Art

Figure 1:
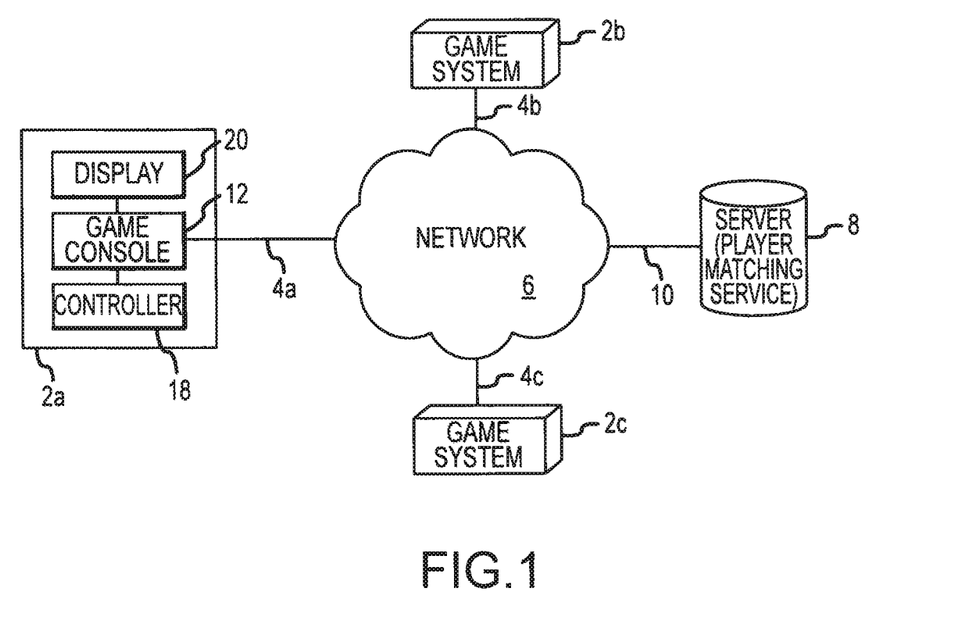
FIG. 1 illustrates a general architecture to support an interactive computer gaming session between multiple users in a network environment as known in the art.

The general architecture to support an interactive computer gaming session between multiple users in a network environment is illustrated in FIG. 1. Such an architecture, and variations thereto, is well-known to one skilled in the art.

FIG. 1 illustrates three computer game systems 2a, 2b, 2c. Each system is connected to a network 6 via a respective network connection 4a, 4b, 4c. The network 6 may be the Internet. A server 8, supporting a player matching service, is also connected to the network 6 via a network connection 10. As illustrated with reference to computer game system 2a, each computer game system typically includes a computer game console 12 or hardware device, a player/user input device or controller 18 connected to the computer game hardware device 12, and a display 20 connected to the computer game hardware device. The computer game console 12 is adapted for connection to the network connection 4a. Although in the example shown the controller 18 and display 20 are shown as distinct from the console 12, the computer game system may be implemented in a variety of ways, for example with the controller, display and console forming a single integrated device.

The player matching service provided by the server 8 allows for details of interactive games to be uploaded thereto, so as they may be displayed to other users. A games player, such as a games player associated with computer game system 2a, may initiate a new interactive game, and upload details to the server 8. The purpose of the player matching service is to enable other players to join the initiated game. The game matching service may display such details as the identity of the game to be played, the identity of the game host (i.e. the games player initiating the game), and details of any other games players who have registered to play the game. The gaming matching service operates to facilitate matching of players for an interactive game session, and has no involvement in the playing of the game.

The initiation of the game with the player matching service creates a so-called lobby for the game. On a player accessing the player matching service and registering to play a game, in accordance with various known techniques, a suitable screen is displayed to the player. The screen may display, for example, the identity of all players of the game, showing game details and options, and a list of game players. Games may be associated with a maximum number of players, which may be limited by the game application or by the game host. In dependence on the number of players that may be involved in a game, a number of so-called slots for the game are made available. Once the maximum number of players for the game is reached, all slots are filled and the lobby is closed to new players.

Once the players for the game are registered and the lobby closed, the communication between the computer game systems of the registered players is on a peer-to-peer network basis. The specific communications between the computer game systems during a game may vary. Each computer game system operates autonomously and generates its own graphics for display, based on information received on the peer-to-peer network. Each computer game system therefore needs to receive data associated with user inputs from all other players in the game. This may be done by each computer game system transmitting the user input data at its terminal to all other players, for example, or by all computer game systems transmitting their data to the host system, which in turn transmits it to the other computer game terminals. The former is preferable.

Each computer game system thus preferably broadcasts its user input data to the other computer game systems involved in the interactive game session. This broadcast is limited insofar as the data is only transmitted to the other computer game terminals in the game. For this purpose each computer game system may receive, as part of the initialization process in the lobby, the data address (such as the IP address) of each other computer game system. All data transmitted from a computer game system is then transmitted with the addresses of all computer game systems.

Each computer game system processes the game data, in conjunction with the data received from other computer game systems, individually, and renders the game graphics to its associated display. Each system requires the user input data of all other games systems for the interactive game to operate.

Problems exist with current networked multi-user interactive game applications such as described above.

Game sessions are locked to new players once a game is underway. This means that the number of games available and listed to play at the player matching service is limited, as it does not show those games for which a session is currently underway. It is not possible for a player to register with a game that is underway.

If games that are underway are listed, and therefore a player can register with the game, the player can only watch the existing game until it is finished. Only thereafter may they take part.

For certain players, it may be undesirable to join an interactive game, due to a lower skill level than other players involved in the game. The only way in which a games player can develop skills in the game may be to join a networked interactive game in which the skill levels of the other games players is significantly higher.

For players of low skill levels, such as players new to the game or learning the game, their participation in a networked interactive game may be detrimental to other players, since their lack of skills may results in collisions that interfere with game playing for more skilled players.

It is an Aim of the Invention to Solve One or More of the Above-Stated Problems.

SUMMARY OF THE INVENTION

The invention provides a method of operating an interactive computer game on a computer games terminal, comprising the steps of: receiving, at the computer games terminal: interactive user input data from a controller associated with the computer games terminal; non-interactive user input data from a controller associated with a further computer games terminal, associated with a non-interactive user; and rendering a graphical representation of the computer game based on the interactive user input data and, selectively, the non-interactive user input data.

Thus a computer game terminal on which an interactive game is played may be adapted such that, selectively, non-interactive user input data may be rendered.

In addition, only part of any non-interactive user data may be rendered.

The method further comprises processing the received interactive user data and non-interactive user data, the processing step being adapted to inhibit any interaction between a displayed avatar associated with the interactive user input data and a displayed avatar associated with the non-interactive user input data.

The rendering step may be adapted to render the graphical representation based on part of the non-interactive user input data.

The method further comprises the step of receiving interactive user input data from a controller associated with at least one further computer games terminal, the rendering step including the step of rendering said data.

The method further includes the step of determining whether received data is interactive data or non-interactive data.

The invention provides a computer game terminal for operating an interactive computer game comprising: an interface for receiving interactive user input data from a controller associated with the computer games terminal; an interface for receiving non-interactive user input data from a controller associated with a further computer games terminal, associated with a non-interactive user; and a display driver for rendering a graphical representation of the computer game based on the interactive user input data and, selectively, the non-interactive user input data.

The computer game terminal may further comprise a processor for processing the received interactive user data and non-interactive user data, the processing step being adapted to inhibit any interaction between a displayed avatar associated with the interactive user input data and a displayed avatar associated with the non-interactive user input data.

The interface for receiving non-interactive user input data may be a network interface.

The computer game may further include an interface for receiving interactive user input data from one or more controllers associated with one or more further computer games terminals.

The invention provides a computer program for operating an interactive computer game on a computer games terminal, comprising the steps of: receiving, at the computer games terminal: interactive user input data from a controller associated with the computer games terminal; non-interactive user input data from a controller associated with a further computer games terminal, associated with a non-interactive user; and rendering a graphical representation of the computer game based on the interactive user input data and, selectively, the non-interactive user input data.

The invention provides a computer program product for storing computer program code adapted for operating an interactive computer game on a computer games terminal, comprising the steps of: receiving, at the computer games terminal: interactive user input data from a controller associated with the computer games terminal; non-interactive user input data from a controller associated with a further computer games terminal, associated with a non-interactive user; and rendering a graphical representation of the computer game based on the interactive user input data and, selectively, the non-interactive user input data.

The invention provides a method of operating an interactive computer game on a plurality of interconnected computer games terminals, comprising the steps of: receiving, at each of a plurality of computer games terminal: interactive user input data from a controller associated with the computer games terminal; interactive user input data from a controller associated with each of the other of the plurality of computer game terminals; and rendering a graphical representation of the computer game based on the interactive user input data, the method further comprising: receiving, at at least one of the plurality of computer game terminals, non-interactive user input data from a controller associated with a further computer games terminal associated with a non-interactive user; rendering, at said at least one of the plurality of computer games terminals, the graphical representation of the computer game based on the interactive user input data and, selectively, the non-interactive user input data.

The method may further comprise the steps of: receiving, at the further computer game terminal, the interactive user input data from each controller associated with the plurality of computer games terminals; and transmitting the non-interactive user input data.

The invention provides a network of computer game terminals each adapted for operating an interactive computer game, comprising, at each computer game terminal: an interface for receiving interactive user input data from a controller associated with the computer games terminal; an interface for receiving user input data; a controller associated with each of the other of the plurality of computer game terminals; and a display driver for rendering a graphical representation of the computer games based on the interactive user input data, at least one of the computer games terminals being further adapted to receive, at an interface, non-interactive user input data from a controller associated with a further computer games terminal, the display driver being further adapted to selectively render the non-interactive user input data.

BRIEF DESCRIPTION OF THE FIGURES

The invention will now be described by way of example with reference to the accompanying Figures, in which.

DESCRIPTION OF PREFERRED EMBODIMENTS

The invention is described herein by way of reference to particular examples and preferred embodiments The invention is not limited to any aspects of such examples and preferred embodiments. The examples and preferred embodiments are presented for the purpose of illustrating the concepts of the invention and for ease of understanding of the invention, and do not limit the scope of the invention.

In one arrangement, a game application is modified to allow inclusion of a so-called non-interactive player. The game application is adapted to allow registration of non-interactive players. The non-interactive player registers with the game in the usual way, but specifically as a non-interactive player.

In one preferred arrangement, the presence of the non-interactive player is hidden from any interactive game player. This preferred arrangement is described further with reference to FIGS. 2 and 3.

Figure 2:
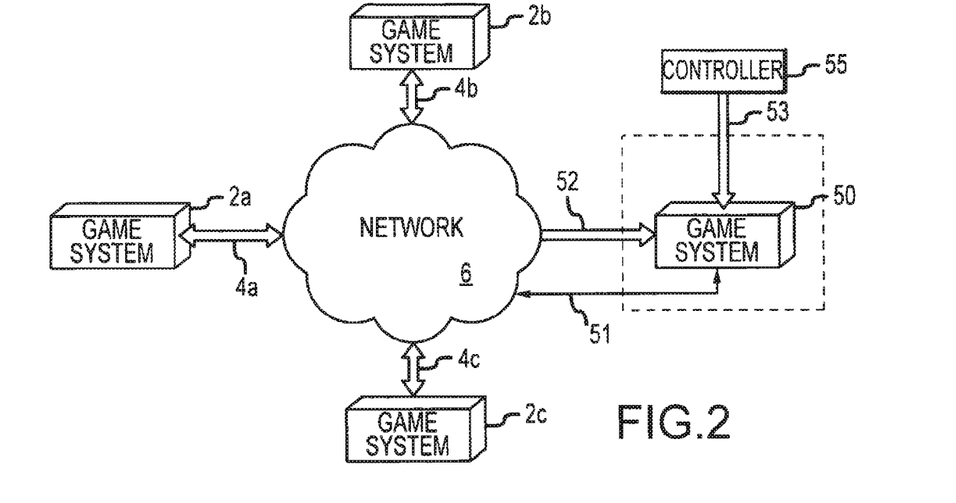
FIG. 2 illustrates an architecture to support an interactive computer gaming session between multiple users in a network environment adapted in accordance with an embodiment of the invention.

With reference to FIG. 2 there is illustrated a network environment of FIG. 1, including game systems 2a, 2b and 2c. In accordance with techniques known in the art, each of the game systems 2a, 2b and 2c is registered to play an interactive game, one of the game systems being the game host. The set-up, registration and initiation of such an interactive game in a networked environment are well understood by one skilled in the art.

In addition in FIG. 2 there is shown a game system 50 associated with a non-interactive game player. The non-interactive game player registers to play the interactive game in accordance with a preferred arrangement, but does not become an interactive game player for the game. Bi-directional interface 51 represents an exchange of control information.

Upon registration, the details of the non-interactive player and the game system 50 of the non-interactive player are registered and stored with the details of interactive players in the usual way. The address of the non-interactive player is included as an address to which the computer game systems 2a, 2b, 2c of active players should transmit (or broadcast) their data.

Thus the registration for an interactive game is modified such that a games player may register as either an interactive player or a non-interactive player. In the event that all game slots are filled, and therefore the option to register as an interactive player is not available, the games player will only have the option to register as a non-interactive player.

Once registration is complete for all games players, and the game is ready to begin, the details of all interactive games players are provided to the game systems of each interactive player. This may simply involve providing each game system with the address (such as the IP address) of all other interactive game systems participating in the interactive game. In this way each interactive game system can transmit (or broadcast) their data to the other interactive game systems. Such distribution of information to the game systems on completion of registration for the game is known to one skilled in the art.

In accordance with this preferred arrangement, each of the interactive game systems is additionally provided with the address of a game system associated with any non-interactive, but registered, games player. In this way the interactive games data from each game system is transmitted (or broadcast) to the game systems associated with non-interactive games players.

In the example architecture of FIG. 2, the games system 50 associated with a non-interactive player receives their interactive game data on network interface 52.

As the game system 50 associated with a non-interactive player is not interactively involved in the game, there is no requirement for the game system 50 to be provided with the addresses of the interactive game systems 2a, 2b, 2c. Alternatively the addresses of all interactive game systems and non-interactive game systems may be provided to all game systems registered, but any game system which is registered as a non-interactive game system may additionally be provided with an instruction to disable transmission of the games data. Alternatively all games systems may transmit data, with the interactive game systems adapted to ignore any transmissions from a non-interactive game system.

In addition to receiving the interactive games data on network interface 52, the games system 50 receives user input data on controller interface 53 from controller 55. The user input data on controller interface 53 is that of the non-interactive games player using games system 50.

A characteristic of the architecture required for this preferred arrangement is that the interactive game systems operate as normal to render the interactive game to their respective displays. Any non-interactive game system similarly operates conventionally to render the interactive game to its associated display. In addition, however, any non-interactive game system renders additional information based on user input data provided by the non-interactive games player associated with a non-interactive game system. Thus, in effect, the non-interactive games player plays alongside the interactive game, and this is rendered to the display of the non-interactive games player, but the non-interactive games player data is not rendered to the displays of the interactive games players by their respective game systems.

A further preferred characteristic is that the non-interactive game system prevents interaction between a game element controlled by the non-interactive player and any interactive game element.

Thus the computer game system of a non-interactive player receives the broadcast game information and is able to render that to the display of the computer game console of the non-interactive player.

Figure 3:
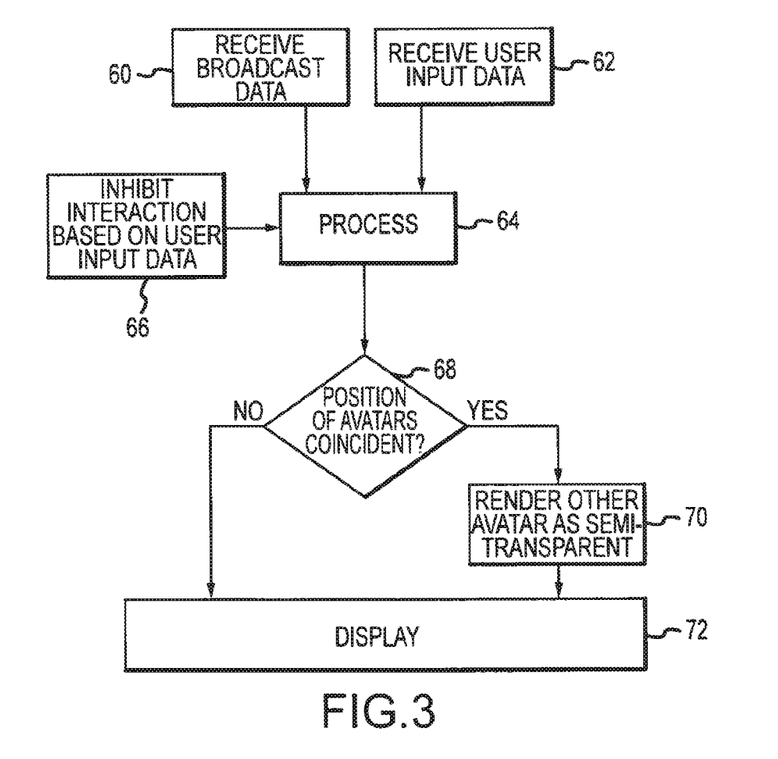
FIG. 3 shows a flow diagram of the main process steps for adapting a computer games system for the architecture of FIG. 2.

The operation of the game system 50 in accordance with this preferred arrangement is described further with reference to the flow process chart of FIG. 3.

As denoted by step 60, the game system 50 receives the broadcast data from the game systems of the interactive players, such as game systems 2a, 2b, 2c. This data is received on the network interface 52. In addition, as denoted by step 62, the game system 50 receives user input data. The user input data is provided on interface 53 from controller 55. As discussed hereinabove, the controller may be integral to the game system or may be connected thereto. In FIG. 2 the controller 55 is shown as being separate but connected to the game system 50. This is merely illustrative.

In a step 64 the game system 50 processes the received data. The process operation is a conventional operation for the game system, to operate on the received games data to render a graphical image to the game system display. In accordance with this preferred arrangement, the process 64 receives an additional input from a step 66, which is an instruction to inhibit interaction based on any received user input data. As the non-interactive player is not an interactive player of the game, any interaction between that player and the interactive players preferably is inhibited.

As is conventional, the computer game system of the non-interactive player renders an avatar to the display of the non-interactive player's computer game system, being the avatar associated with the non-interactive player, as well as rendering the avatars of the interactive games players based on the data received in step 60. The non-interactive player may thus play alongside the interactive game, but the avatar is only displayed on their display: their data is not transmitted to or rendered by the other players' computer game systems.

In order to ensure that the non-interactive player, whose avatar is not displayed on the other computer game displays, cannot interfere with the interactive game, no collisions or interference of their avatar with other active aspects of the game are permitted. Thus, for example, in a car racing game, if the avatar of the non-interactive player collides with the avatar of an interactive player, on the display of the non-interactive player the avatar is shown as 'ghosting' through the other avatar. This may be achieved by rendering the avatar of either the non-interactive player or the interactive player as semi-transparent on the non-interactive players display but with both images still otherwise fully rendered.

This is implemented in a step 68. In a step 68 the game system 50 determines whether the position of a user avatar coincides with that of another avatar or active game element. As to what is meant by "coincides" may be determined on an implementation basis. Thus it may be determined that the position of a user avatar and an interactive avatar coincide if they are within a certain proximity of each other, or it may only be decided that they coincide if they at least partially overlap.

If it is determined in step 68 that the position of a user avatar and an interactive avatar coincide, then in a step 70 the interactive avatar is preferably rendered as semi-transparent. Thus the avatar associated with a non-interactive user, which the non-interactive user controls, remains unchanged, but the interactive element with which a coincidence has taken place is rendered semi-transparent.

After either step 68 or step 70 the computer game system 50 renders the process data (or transmits the process data) to the display, as denoted by step 72.

Thus the game system 50 of a non-interactive games player is adapted in order to control the images rendered to the display of the game system 50 so as no interaction with the interactive game takes place. The game systems of the interactive games players operate as is conventional, and are unaffected by the operation of the game system 50.

A non-interactive player may join the game from the start. In such a way a player may join as a non-interactive player from the start of the game, and play the full game. The non-interactive player may join in the game lobby. This may be advantageous to a player to allow them to practice, for example, against good players without having to identify themselves. This may be particularly advantageous where a player is learning the game or trying to improve their skills to be more competitive with better players. Where a non-interactive player joins for the start of the game, the game data—such as fastest lap time—for the player may still be retained as game data.

A non-interactive player may alternatively join the game whilst it is underway. Thus the advantages of being in the game may similarly be gained. In addition, this allows a player who wants to actively take part in a game the option of maintaining their interest, or practicing, whilst they wait for a next game to start. Where a non-interactive player joins a game which is underway, their avatar may be introduced alongside whatever current action is taking place. In a car racing game, for example, their avatar may receive a 'rolling start' alongside the interactive avatars of other players.

There may be a plurality of non-interactive players. Each non-interactive player may receive the broadcast data from the active players. The computer game system of the non-interactive player renders this on the display of the non-interactive display, and additionally renders the user inputs from the non-interactive player. In this way multiple non-interactive players may play an interactive game as a non-active player, only seeing their own avatar added to the interactive game, and not being able to interact with the interactive game.

Thus in this arrangement a non-interactive player is able to play a game alongside interactive players, but the non-interactive player's presence is unknown to the interactive players of the interactive game, and does not interfere with the interactive game.

The preferred arrangements described with reference to FIGS. 2 and 3 has been described in the context of a non-interactive user playing alongside an interactive game in which there are a plurality of interactive users. This arrangement is not limited, however, to an interactive game comprising a plurality of users. The non-interactive player may play alongside an interactive game that has one or more interactive elements, and the interactive elements may be system or game controlled rather than user controlled.

In this arrangement there is thus provided a method of controlling an interactive computer game in which a plurality of users control a respective plurality of game characters, including: a first display associated with a first user and a second display associated with a second user. A game character or characters may be associated with one or more first users and be displayed on both the first and second display. Also, a game character may be associated with a second user and be displayed on only the second display. In some embodiments, the first and second user characters do not interact.

In this arrangement there is thus also provided a method of playing an interactive computer game including: receiving interactive game data associated with at least one active user of the interactive game; receiving user inputs from an inactive user; and displaying the interactive game in dependence on the received interactive game data and the received user inputs, In this arrangement there is thus also provided a method of playing an interactive computer game, including: receiving interactive game data associated with at least one active user of the interactive game; receiving interactive game data associated with at least one non-active user of the interactive game; and displaying the interactive game in dependence on the received interactive game data and the received user inputs. Typically, the user inputs of the non-active player are not allowed to cause an interaction with an active element of the interactive game.

In another arrangement, a game application is modified to allow a non-interactive player to play in a previous interactive game. This preferred arrangement is described with reference to FIGS. 4 and 5.

With reference to FIG. 4a there is again illustrated the general network architecture of FIG. 1, showing game systems 2a, 2b and 2c associated with interactive games players. In addition there is illustrated a server 80 which receives data from the network on a network interface 82, and communicates control information with other elements attached to the network via bi-directional communication interface 84.

Figure 4A:
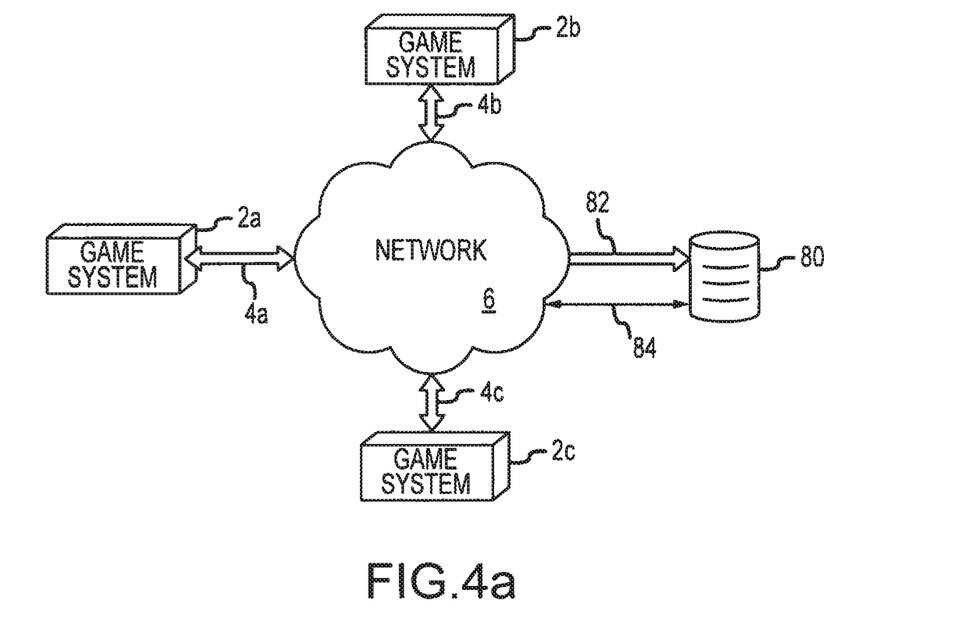
FIGS. 4(a) and 4(b) illustrate an architecture to support an interactive computer gaming session between multiple users in a network environment adapted in accordance with a further embodiment of the invention.

In this arrangement the server 80 is adapted to run an application that receives all game data for the interactive game on network interface 82. Thus an application running on the server 80 may register for the interactive game using bi-directional control interface 84, as a non-interactive player, in order to receive the game data. The interactive game data is then stored on the server 80. Other techniques for the server 80 to receive the game data may be possible such as, for example, all games initiated using the interactive gaming system being transmitted thereto.

The server 80 thus stores data associated with played interactive games. This data may be made available at a later time/date as discussed below.

Figure 5A:
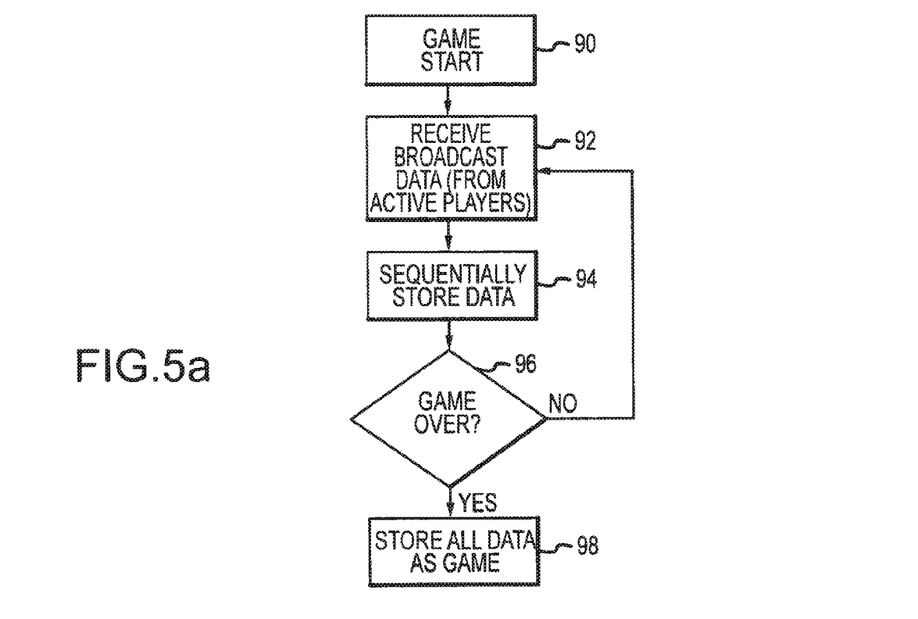
FIGS. 5(a) and 5(b) show flow diagrams of the main process steps for adapting a computer games system for the architecture of FIGS. 4(a) and 4(b)

The operation of the server 80 in accordance with this arrangement is described further with reference to the flow chart of FIG. 5a. In a step 90 the game starts, and then in a step 92 the server 80 receives broadcast data from the interactive game on interface 82. In a step 94 the server 80 sequentially stores the interactive data, or stores the data with appropriate time information. In a step 96 it is determined whether the game is completed. If the game is not completed then the process returns to step 92 and 94. If the game is completed then in a step 98 the game is marked as completed and stored as a completed previous game.

Figure 4B:
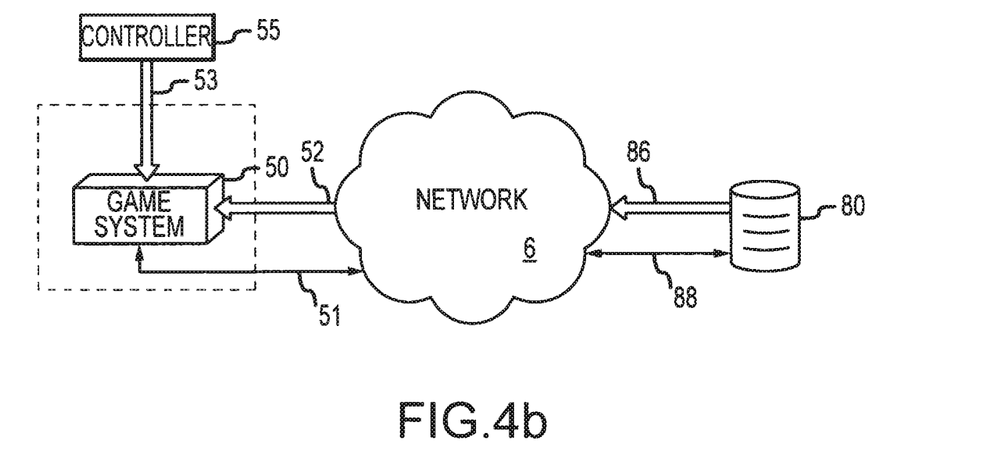

The server 80 may be accessed in order to obtain a previously player interactive game. With reference to FIG. 4b this is described further.

FIG. 4b shows a non-interactive game system 50, such as the non-interactive game system 50 of FIG. 2, associated with a non-interactive games player. Under the control of the non-interactive games player, the game system 50 communicates with the server 80 over the network 6. The game system 50 communicates on the bi-directional control interface 51, with a bi-directional control interface 88 of the server 80. The game system 50, on interfacing with the application running on the server 80, is provided with a graphical interface, rendered to the display associated with the game system 50, which shows previous interactive games that are available to be accessed. The game system 50, under control of a non-interactive games player, may select a previously played game stored at the server 80. The game data is transmitted on network interface 86 and received on network interface 52 by the game system 50. The game may be downloaded in its entirety and stored at the game system 50, or may be downloaded and used by the game system 50 as it is received.

In this way the game system 50 is able to replay a previous interactive game, and in dependence on the data received on the interface 50 is able to display the previous interactive game by rendering the data. The game system 50 renders the data in exactly the same way it would in receiving the data in real-time during an interactive game session. In addition, the game system 50 may receive user data on interface 53 from the controller 55 and render this data appropriately to the display of the system alongside the replayed interactive game.

As described, hereinabove with reference to the arrangement of FIG. 2, a non-interactive game player may then play alongside an interactive game, the only difference being that this is a, replayed, game rather than a real-time game.

Figure 5B:
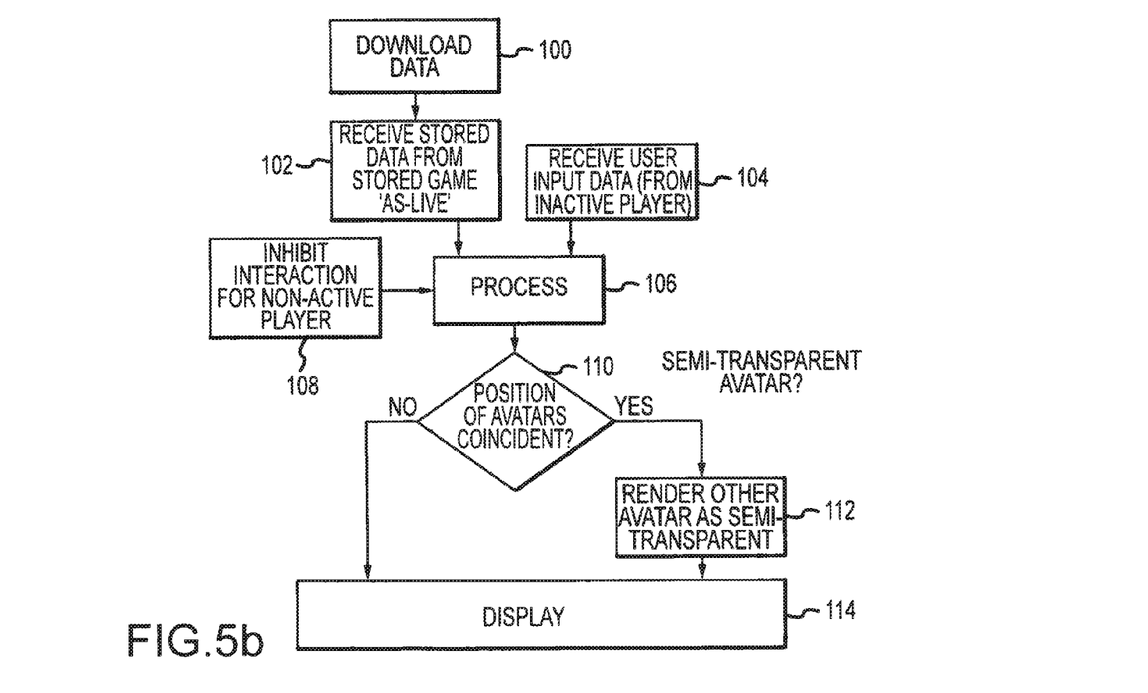

The operation of the game system 50 in accordance with this arrangement is described further with reference to FIG. 5b.

In a step 100 the game system 50 downloads data from the server 80. In a step 102 the game system 50 receives the interactive games data from the server 80. This data is received "as-live", such that the interactive game can be rendered from the data and displayed to the display of the game system. Data may be downloaded from the server and rendered as it is received, or may be downloaded from, the server and stored at the game system and rendered as it is accessed from the game system memory. In addition the game system receives the user input data from the non-interactive player on interface 53, as denoted by step 104.

In a step 106 processing of the interactive game data and the user input data takes place. As noted by input from step 108, interaction of the non-interactive player with the interactive game is inhibited.

In a step 110, similar to step 68 of FIG. 3, it is determined whether the position of an avatar associated with a, non-interactive player coincides with an avatar of an interactive element of the replayed interactive game. In the event that such coincidence is detected, in a step 112 the avatar of the interactive element is rendered, semi-transparent. In a step 114 the replayed interactive game is rendered to the display, alongside the avatar for the non-interactive player.

In this arrangement the interactive game is replayed in dependence on the data generated during the interactive game, which has been stored, and not as a movie or video. Thus the computer game system of a non-interactive player receives the interactive game data and renders the game to the display 'as-live'. In addition the computer game system renders the user input data from the controller of the non-interactive player. Thus the non-interactive player plays alongside the replayed interactive game.

The application is preferably controlled such that no interaction is allowed between the avatar of the non-interactive player and the avatars of any interactive data of the replayed interactive game. If such interaction is permitted, the game may be required to terminate as soon as an interaction occurs, e.g. in a racing game as soon as a collision occurs, as the flow of the game is then lost.

In this arrangement it is not essential for a server to store previous games. A games system such as games system 50 may store an interactive game as it is played, for later use. A games system may need to register to a game—as interactive player or non-interactive player—to receive the game data.

In this arrangement there is thus provided a method of playing a computer game, comprising: downloading a previously played computer game; replaying the downloaded game; and playing the downloaded game.

In this arrangement there is also thus provided a method of playing a computer game, comprising: saving a previously played computer game; replaying the saved game; and playing the saved game.

In a further arrangement, a game application is modified to provide for a non-interactive game player's avatar to be displayed to one or more players of the interactive game. This further arrangement is described with reference to FIGS. 6 and 7.

Figure 6:
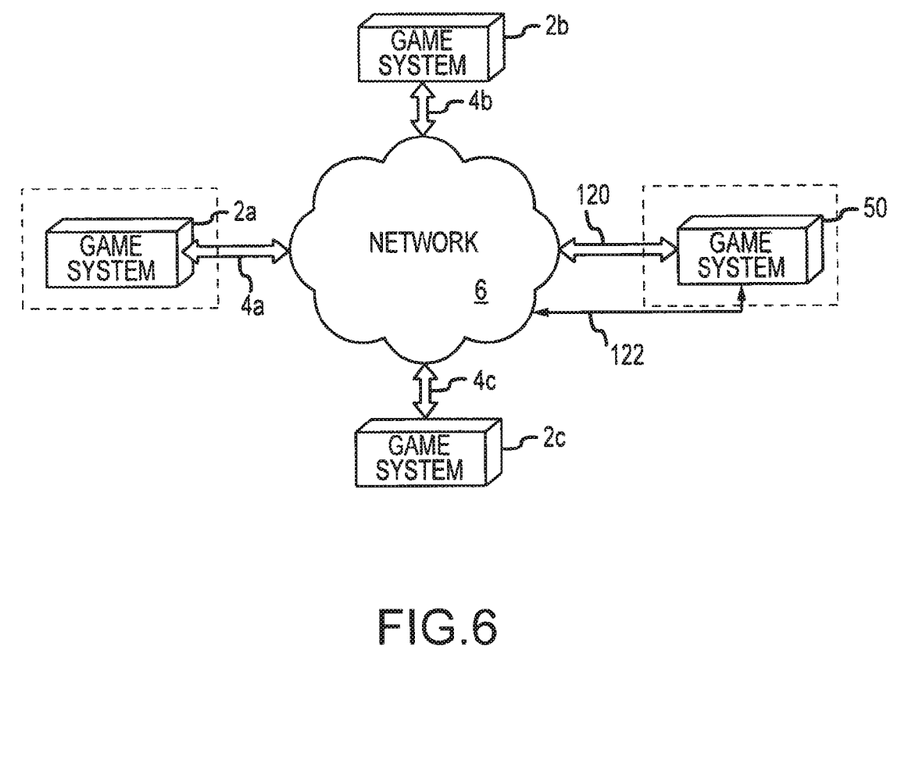
FIG. 6 illustrates an architecture to support an interactive computer gaming session between multiple users in a network environment adapted in accordance with a still further embodiment of the invention.

This further arrangement requires the computer game terminal of the non-interactive player to broadcast the user data of the non-interactive player to the computer game systems of the interactive players. As a non-interactive player, however, the non-interactive user's avatar is still not enabled to interact with an interactive player's avatar. Thus, in a racing game, the avatar of a non-interactive user 'ghosts' through another car in the event of a collision, e.g. by being rendered as semi-transparent.

With reference to FIG. 6, there is again illustrated the general interactive network game environments of FIG. 1, showing interactive game systems 2a, 2b, 2c. Also illustrated is the non-interactive game system 50. In this further arrangement the non-interactive game system 50 is adapted to transmit the games data associated with the controller of the game system 50 on interface 120 to the network 6, as well as receiving games data from the interactive game systems on the network interface 120. The game system 50 is associated with bi-directional control signals 122, which allow control information to be passed between the interactive game systems, for example during registration for the game.

In addition, one or more of the interactive game systems 2a, 2b, 2c are adapted to allow the user thereof to display the avatar associated with the non-interactive game player. The user of an interactive game system such as game system 2a may have the option, during the registration process in the games lobby, to select one or more non-interactive games players such that the games data associated with that player will be rendered to the display of their game system. Alternatively the user associated with the game system 2a may be able to access an option during a game play to identify any non-interactive game players and render their data. The game system application of an interactive game player is therefore adapted to allow rendering of an avatar associated with a non-interactive game player, but as described previously hereinabove with reference to other arrangements, as the games player is non-interactive then any interaction between such avatar and interactive elements of the game must be inhibited.

Figure 7:
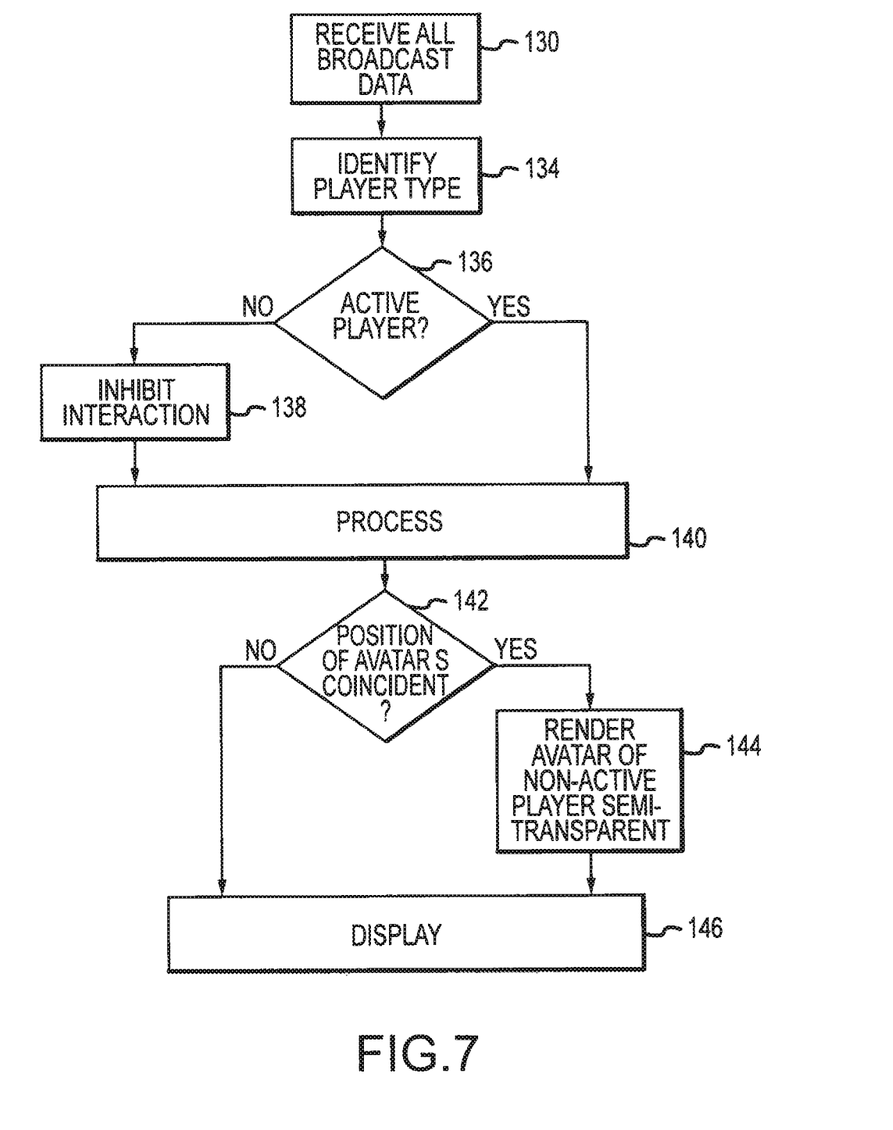
FIG. 7 shows a flow diagram of the main process steps for adapting a computer games system for the architecture of FIG. 6.

This further arrangement is described in more detail with reference to the flow process of FIG. 7. In a step 130 an interactive game system, such as game system 2a, receives all broadcast data on an interface 4a. This is a conventional arrangement, where any interactive game system receives interactive game data. The received interactive game data includes game data, including user input data, from one or more non-interactive game systems, such as game system 50.

In a step 134 the game system 2a identifies the player type of the game data received from each player. Thus game data is determined as being associated with either an interactive player or a non-interactive player. In the event that game data is identified in a step 136 as being associated with a non-interactive player, then in step 138 any interaction associated with such data is inhibited. In a step 140 the game data is then processed.

In a step 142, similar to step 68 of FIG. 3, it is determined whether the position of an avatar associated with an active player is coincident with an avatar of a non-interactive player. In the event that a positive determination is made, then in a step 144 the avatar of the non-interactive player is rendered as semi-transparent. In a step 146 the appropriate games data is displayed to a display associated with the game system 2a.

Thus in this further arrangement, an application running on an interactive game system is further adapted in order to be able to distinguish between game data associated with interactive players and non-interactive players. The game system associated with a non-interactive player is adapted to transmit user input data for that game system to the network. However this games data may in any event be made available in other arrangements, the game systems of interactive players being adapted to determine whether that data is processed or ignored.

There is thus provided a method for participating in a multi-user interactive game, comprising: receiving interactive game data generated by computer game consoles of a plurality of active players in a game; receiving user input data generated by a user input device of a non-active player of said game; displaying the game in dependence on the interactive game data and the user input data.

In the further arrangement further modifications may be applied. In an interactive computer game, in addition to all interactive game terminals being able to receive game data from the various interactive game systems, other levels of interaction may be provided. For example, interactive game players may be able to talk and listen to each other. In the arrangement described hereinabove, where an interactive game player selects the option to allow an avatar associated with a non-interactive game player to be displayed on their display, it may select to all or to not allow any voice data from the non-interactive games player to be played.

Similarly in an arrangement in which a non-interactive player is allowed to receive interactive game data from a number of interactive players during an interactive game, the configuration of the interactive game may limit the data available to non-interactive games players. Thus the necessary data to render images to the display, and associated sounds with interactions of those images, may be transmitted to the non-interactive player. However voice data associated with the interactive players of the game may not be transmitted from the interactive games consoles. Thus the interactive games data broadcast may be restricted or limited compared to that which is available to the interactive game players.

Various aspects of the various described arrangements may be combined, no described arrangement being limited to a stand-alone arrangement. In a preferred implementation, all described arrangements are implemented together. Various additional modifications and variations to the invention and its described embodiments will be apparent to one skilled in the art. All deviations from the specific teachings of this specification that rely upon the principles and their equivalents through which the art has been advanced are within the scope of the invention as described and claimed.

For example, the above description comments on the usefulness of the described techniques in providing enhanced operations in the case of an interactive game involving multiple interactive networked players, and particularly for an interactive racing game. The techniques are readily applicable to many other interactive game settings in which a player moves a user-controlled character (avatar) through a virtual game world, interacts with game (or other user) controlled characters (avatars) or objects, including responding to the interaction by selecting particular behaviors or actions for their user-controlled characters, and views the actions of the game controlled characters as they respond to these behaviors or actions.

An embodiment of the invention may include a video game device capable of executing a video game program that incorporates the applications in arrangements discussed above. While such an interactive game program can be executed under any computer system capable of communicating with other devices, the following description is directed to an interactive game program being executed by an interactive game device (e.g., a particular example of an information processing device or computing device) which may be a standalone device for one or more users or a device capable of communicating with other devices. The invention is not limited to use to a particular interactive game device, but it may be implemented with any interactive game device capable of executing an interactive game program according to the present invention, such as a portable interactive game device, an interactive game device adapted for use with a television or other monitor, a computer such as a desktop, laptop, notebook, or other computer, a telephone such as a cellular phone, or any other electronic device adapted for running an interactive game program including the animation methods of the invention.

Figure 8:
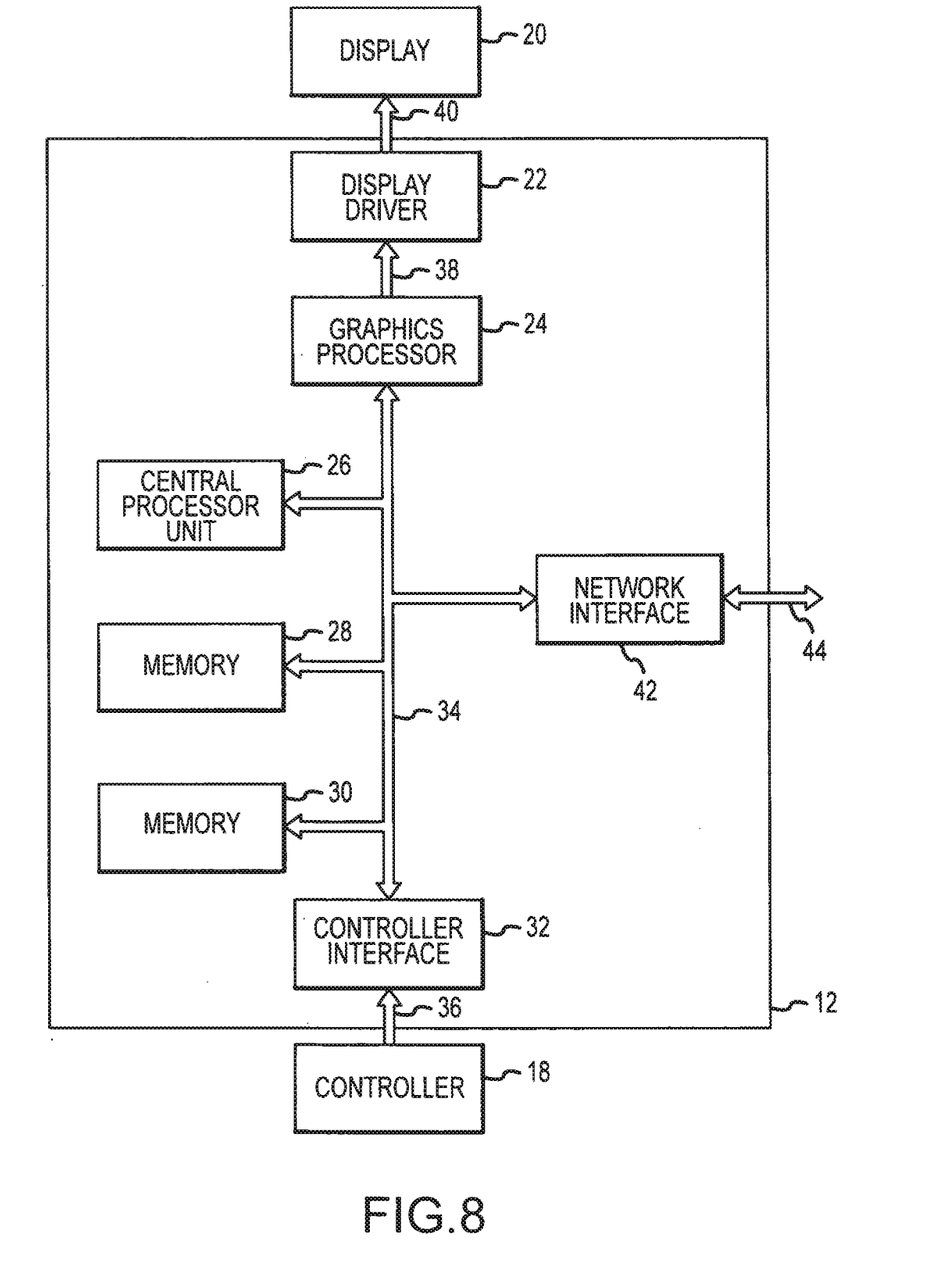
FIG. 8 illustrates the main functional elements of a computer games console as known in the art.

An example interactive game device or system is shown in FIG. 8, and denoted by reference numeral 12. The device includes a graphics processor 24 controlling a display driver 22 via a graphics bus 38, a controller interface 32 receiving controller data on a controller interface bus 36, a central processor unit (CPU) 26, a network interface 42 connected to a network bus 44, and memory modules 28 and 30. A system bus 34 connects various elements. The display driver 22 drives the display 20 via display bus 40.

The example interactive game device of the invention may include one or more monitors on which graphics may be displayed such as one or more LCDs (Liquid Crystal Display) and such a display or monitor may be provided within the game housing or as a separate monitor (such as a television). While LCDs are one preferred embodiment, the monitor or display device may be of any other suitable type, e.g., an EL, (Electro Luminescence) display device. Moreover, the resolution of the monitor or display device is not limited to the particular resolution used herein. One or more speakers allowing game sounds to pass through may also be provided as part of the interactive game device or external speakers may be used such as provided in a television or attached to the game device. The interactive game device may include user input or interface devices such as a set of input devices that may include typical video game input devices such as a cross-shaped switch, a start switch, a select switch, an A button, a B button, an X button, a Y button, a power switch, a left or L button, a right or R button, and the like such as a touch screen or peripherals such as a joystick. Another input device is a touch panel or screen attached on the screen of a second LCD. The housing in many embodiments includes slots for accommodating a memory card (e.g., a game cartridge). The memory card or game cartridge is a storage medium storing the interactive game program run by the interactive game device and, typically, for storing the animations described herein. In other embodiments, though, the interactive game program(s) and graphics may be accessed via a communications network such as the Internet (as described herein).

In implementations in which the video game device is a portable device or is a device that is linked to a television or other monitor/speaker system, the internal configuration of the video game device may include a CPU 26 mounted on an electronic circuit board positioned in the game housing. The CPU 26 may be connected to an input/output interface circuit, one or more GPU (Graphics Processing Unit) 24 and a monitor controller as display driver 22 such as via bus 34. A connector or memory interface may be provided for receiving a memory card, which may include ROM storing the video game program including the animations and RAM such as for rewritably storing backup data. The video game program stored in the ROM of the memory card is typically loaded to the RAM, and the loaded video game program is executed by the CPU during operation of the video game device. In addition to the video game program, the RAM also stores temporary data produced while the CPU is running a program. The input/output circuit may be connected to the user inputs or control switch section (e.g., user interface) and monitor. Video RAM or VRAM may be used to provide storage of animations or images rendered according to the invention and may be stored in RAM prior to display by the GPU or other graphics controllers. Memory blocks 28 and 30 connected to bus 34 represent different possible types of memory.

As will be clear to those skilled in the arts, numerous embodiments of interactive game apparatus and interactive game controllers may be used to practice the present invention, e.g., to run the methods described herein as part of an interactive video game program stored on storage medium such as memory card, game cartridge, or the like, and the above description of an interactive game device is not intended to limit the breadth of coverage. For example, the interactive game program may be stored on a disk (e.g., a CD or other data storage media) and downloaded into a computer's memory to be run or run from disk. Alternatively, the game program and its animations may be accessed by using an electronic device to access a Web site or to access (in a wired or wireless manner) memory over a digital communications network such as the Internet and the interactive game may be run remotely or after storage on local memory.

The invention claimed is:

1. A method of operating an interactive computer game on a computer games terminal associated with a non-interactive player, comprising:
   receiving, at the computer games terminal:
      a selection of a previously played interactive computer game stored in memory;
      interactive user input data from a controller from a set of game data for the previously played and stored interactive computer game; and
      non-interactive user input data from a controller associated with the computer games terminal; and
   rendering a graphical representation of the previously played and stored interactive computer game based on the interactive user input data along with the non-interactive user input data, whereby a game element controlled by the controller associated with the computer games terminal is inserted into the previously played and stored interactive computer game.

2. A method according to claim 1 further comprising processing the received interactive user data and non-interactive user data, the processing being adapted to inhibit interaction between a displayed avatar associated with the interactive user input data and a displayed avatar associated with the non-interactive user input data.

3. A method according to claim 1 wherein the rendering is adapted to render the graphical representation based on part of the non-interactive user input data.

4. A method according to claim 1 further including determining whether received data is interactive data or non-interactive data.

5. The method of claim 1, wherein the previously played interactive computer game is stored such that the game data includes the interactive user input data in a sequential configuration and wherein the rendering of the graphical representation includes rendering the interactive user input data in sequential order.

6. A computer game terminal for operating an interactive computer game to provide practice replays of completed games comprising:
   an interface for receiving interactive user input data from a controller, wherein the received interactive user input data comprises game data, including interactive player controller data in sequential order, for a completed interactive computer game;
   an interface for receiving non-interactive user input data from a controller associated with a the computer games terminal, associated with a non-interactive user, wherein the received non-interactive user input data includes game data for the completed interactive computer game; and
   a display driver for rendering a graphical representation of the completed computer game based on the received interactive user input data and the received non-interactive user input data, the graphical representation including at least one game element associated with the received interactive user input data and at least one game element associated with the received non-interactive user input data.

7. A computer game terminal according to claim 6 further comprising a processor for processing the received interactive user data and non-interactive user data, the processing being adapted to inhibit any interaction between a displayed avatar associated with the interactive user input data and a displayed avatar associated with the non-interactive user input data.

8. A computer game terminal according to claim 6 wherein the interface for receiving non-interactive user input data is a network interface.

9. A computer game terminal according to claim 6 further including an interface for receiving interactive user input data from one or more controllers associated with one or more further computer games terminals.

10. The computer game terminal of claim 7, wherein the processing comprises determining whether the avatars coincide in position and, when coinciding, causing the rendering to include a ghosted image of one of the avatars, whereby both of the avatars are concurrently displayed in the graphical representation.

11. A non-transitory computer readable storage medium storing a computer program for operating an interactive computer game on a computer games terminal, comprising the steps of:
- receiving, at the computer games terminal:
  - interactive user input data from a controller associated with the computer games terminal; and
  - non-interactive user input data from a controller associated with a non-interactive player computer games terminal communicatively linked via a network with the interactive user computer games terminal; and
- rendering a graphical representation of the computer game based on the interactive user input data and the non-interactive user input data, wherein the rendering includes providing an avatar based on the non-interactive user input data, the avatar not affecting game play associated with the interactive user input data and the avatar or an avatar rendered based on the interactive user input data being ghosted when the avatars coincide in location.

12. A non-transitory computer readable storage medium for storing a computer program code adapted for operating an interactive computer game on a computer games terminal, comprising the steps of:
- receiving, at the computer games terminal:
  - from data storage, interactive user input data from a controller, wherein the received interactive user input data includes game data for a completed session of the interactive computer game; and
  - non-interactive user input data from a controller associated with the computer games terminal, wherein the received non-interactive user input data includes control data for a game element for the interactive computer game; and
- rendering a graphical representation of completed session of the interactive computer game based on the received interactive user input data and the received non-interactive user input data.

13. The computer program product of claim 12, wherein the graphical representation includes an avatar generated based on the received non-interactive user input data.

14. The computer program product of claim 13, wherein the avatar is generated such that the graphical representation corresponding with the received interactive user input data is unmodified.

* * * * *